(12) United States Patent
Kim et al.

(10) Patent No.: US 7,405,529 B2
(45) Date of Patent: Jul. 29, 2008

(54) SYSTEM AND METHOD FOR CONTROLLING LINEAR COMPRESSOR

(75) Inventors: Nam Su Kim, Seoul (KR); Ji Heon Lim, Suwon-Si (KR); Sung Mo Lee, Gunpo-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 346 days.

(21) Appl. No.: 11/328,091

(22) Filed: Jan. 10, 2006

(65) Prior Publication Data

US 2006/0257264 A1 Nov. 16, 2006

(30) Foreign Application Priority Data

May 13, 2005 (KR) .................. 10-2005-0040198

(51) Int. Cl.
*H02P 5/00* (2006.01)
(52) U.S. Cl. .................. 318/443; 318/119; 318/127; 318/632; 417/44.1; 417/44.11
(58) Field of Classification Search ......... 318/440–447, 318/119, 556, 632; 417/44.1, 44.11, 417
See application file for complete search history.

(56) References Cited

U.S. PATENT DOCUMENTS

| | | | | | |
|---|---|---|---|---|---|
| 3,585,451 | A | * | 6/1971 | Day, III | 361/22 |
| 3,633,073 | A | * | 1/1972 | Day et al. | 361/22 |
| 3,860,760 | A | * | 1/1975 | Rittenbach | 327/100 |
| 6,014,004 | A | * | 1/2000 | Hamaoka et al. | 318/778 |
| 6,084,320 | A | * | 7/2000 | Morita et al. | 310/12 |
| 6,153,951 | A | * | 11/2000 | Morita et al. | 310/12 |
| 6,462,492 | B1 | * | 10/2002 | Sakamoto et al. | 318/400.32 |
| 6,623,246 | B2 | * | 9/2003 | Hwang et al. | 417/44.1 |
| 6,682,310 | B2 | * | 1/2004 | Yoo et al. | 417/42 |
| 6,779,982 | B2 | * | 8/2004 | Heo | 417/44.11 |
| 6,811,380 | B2 | * | 11/2004 | Kim | 417/44.1 |
| 6,815,922 | B2 | * | 11/2004 | Yoo et al. | 318/632 |
| 7,102,306 | B2 | * | 9/2006 | Hamaoka et al. | 318/400.01 |
| 7,271,563 | B2 | * | 9/2007 | Yoo et al. | 318/632 |
| 2002/0051710 | A1 | * | 5/2002 | Yoo et al. | 417/44.11 |
| 2002/0150477 | A1 | * | 10/2002 | Hwang et al. | 417/44.1 |
| 2003/0026701 | A1 | * | 2/2003 | Yoo et al. | 417/42 |
| 2003/0133807 | A1 | * | 7/2003 | Heo | 417/44.11 |
| 2004/0066163 | A1 | * | 4/2004 | Yoo et al. | 318/632 |
| 2004/0067140 | A1 | * | 4/2004 | Yoo et al. | 417/44.1 |
| 2004/0239266 | A1 | * | 12/2004 | Lee et al. | 318/119 |
| 2005/0111987 | A1 | * | 5/2005 | Yoo et al. | 417/44.11 |
| 2005/0158178 | A1 | * | 7/2005 | Yoo et al. | 417/45 |
| 2006/0056979 | A1 | * | 3/2006 | Yoo et al. | 417/44.11 |
| 2006/0056980 | A1 | * | 3/2006 | Yoo et al. | 417/44.11 |
| 2006/0228224 | A1 | * | 10/2006 | Hong et al. | 417/44.1 |

FOREIGN PATENT DOCUMENTS

| | | |
|---|---|---|
| KR | 10-2002-0041984 | 6/2002 |
| KR | 10-2004-0026918 | 4/2004 |
| KR | 10-2004-0101764 | 12/2004 |
| KR | 10-2004-0101768 | 12/2004 |

* cited by examiner

*Primary Examiner*—Paul Ip
(74) *Attorney, Agent, or Firm*—Staas & Halsey LLP

(57) ABSTRACT

A system for controlling a linear compressor, generates freezing force as a piston reciprocates according to rotation of a motor which receives alternating current power through a triac. The system includes a controller which moves up or delays a trigger signal corresponding to an absorption cycle or a compression cycle, such that the center point of the piston reaches a resonant point when a current and a phase difference of the motor deviate from predetermined ranges.

20 Claims, 13 Drawing Sheets

PRIOR ART

PRIOR ART

PRIOR ART

PRIOR ART

PRIOR ART

SYSTEM AND METHOD FOR CONTROLLING LINEAR COMPRESSOR

CROSS-REFERENCE TO RELATED APPLICATIONS

This application claims the benefit of Korean Patent Application No. 2005-40198, filed on May 13, 2005 in the Korean Intellectual Property Office, the disclosure of which is incorporated herein by reference.

BACKGROUND OF THE INVENTION

1. Field of the Invention

The present invention relates to a compressor, and, more particularly, to system and method for controlling a linear compressor, which are capable of controlling a triac to vary a stroke of a piston of the linear compressor.

2. Description of the Related Art

Generally, a linear compressor, whose piston is directly connected to a mover of a linear motor, reciprocates the piston as the motor performs linear motion.

Since a linear compressor does not have a crankshaft, which transforms a rotational motion to a linear motion, frictional loss is relatively small. Therefore, compression efficiency of the linear compressor is greater than that of a general compressor.

Such a linear compressor is operated such that its piston reciprocates based on a voltage, which is applied thereto based on a stroke command set by a user, and thus the stroke is varied to control freezing force. Namely, the stroke is calculated on the basis of the voltage and current applied to a motor of the linear compressor. Afterwards, if the calculated stroke is smaller than the stroke command, a triac, which applies alternating current (AC) to the linear compressor, is operated such that its ON duration is elongated, thereby increasing the voltage applied to the compressor. On the other hand, if the calculated stroke is greater than the stroke command, the triac is operated such that its ON duration is reduced, thereby decreasing the voltage applied to the compressor. Therefore, the stroke cycling distances of the linear compressor are varied by the above-mentioned processes, and thus a freezing force is controlled.

However, the prior art technology has disadvantages in that, although the stroke cycling distance is reduced by a relatively small amount, since the freezing force is rapidly decreased, the frictional loss rate is enlarged when the freezing force is varied, and clearance volume is also increased, thereby decreasing its efficiency. In order to resolve the problems, a prior art technology has been proposed and is described in detail below.

In Korean Patent Application No. 10-2004-0026918 (which was published on Apr. 1, 2004), as shown in FIG. 1, the prior art embodiment includes two windings of a motor, which input direct current (DC) and alternating current (AC), respectively. Also, in Korean Patent Application No. 10-2004-0101764 (which was published on Dec. 3, 2004), a method is adopted which selectively inputs DC and AC on the basis of load. Namely, as shown in (a) of FIG. 2, when AC is applied to the linear compressor under normal conditions (in which load is preset when the linear compressor is designed), since a large force is applied to a piston, the maximum pressing volume is secured. Also, as shown in (b) of FIG. 2, only AC is applied to the linear compressor under a specific load condition (the maximum load), since the shoved amount of the piston is relatively small, the maximum pressing volume cannot be secured. As such, when the maximum pressing volume is not secured, AC and DC are applied to the linear compressor such that the center of the piston cycling is moved to an opposite side of a delivery valve. Therefore, the shoved amount of the piston is increased and the maximum pressing volume can be secured, as show in (c) of FIG. 2.

In the method wherein AC and DC are applied to a linear compressor, pressing efficiency can be designed as the center of the piston cycling is moved, considering load. However, the prior art technology still has disadvantages in that, the efficiency of the motor windings is low and, since motor windings should be additionally installed, the number of assembly processes is increased.

On the other hand, in Korean Patent Application No. 10-2004-0101768 (which was published on Dec. 3, 2004), a method for varying driving frequency of a linear compressor by using inverters to control a stroke is disclosed. As shown in FIG. 3, in order to make the driving frequency coincide with a mechanical resonant frequency as each time load is varied, the driving frequency variable constant is detected as an average value which is obtained by multiplying a stroke by current for a period. Then a driving frequency in a state in which the average value is approximated to '0' is detected, as a driving frequency command value, thereby improving the driving efficiency of the compressor. As such, in order to vary the driving frequency, inverters are used. However, since the controller which controls stroke using the inverters, is expensive, the prior art technology is not cost-effective.

On the other hand, a method which varies stroke based on stroke voltage to control freezing force, has drawbacks in that the center of piston reciprocation is moved according to load conditions when the piston reciprocates. Since the movement distance is increased under overload, the piston and the delivery value collide with each other. In order to resolve this problem, there is a method disclosed in Korean Patent Application No. 10-2002-0041984 (which was published on Jun. 5, 2002). Namely, as shown in FIG. 4, the method involves detecting loads, and controlling phases of triacs according to the loads, changing pressing cycles and expansion cycles. If overload is detected, as shown in FIG. 5, ON durations of the triacs are increased more at the pressing cycle than at the absorption cycle, such that the piston cannot be excessively shoved back. Therefore, a collision between the piston and the delivery valve can be prevented. These technologies should be operated such that an operation unit 300 inputs current of a current detection unit 200, integrates the current for a period, and outputs a work arithmetic signal Wi based on the integration, and a microcomputer 400 reads a pressing difference between absorption and delivery from an absorption/delivery pressing difference storage unit 500 and detects the difference as a load. In order to detect such loads, since current is integrated to operate the work arithmetic signal, the operation processing time is increased, and the pressing difference between absorption and delivery for each work arithmetic signal according to a load condition is experimentally obtained. Also, the obtained difference must be stored, and it is difficult to reflect all of the calculated work arithmetic signals thereto.

SUMMARY OF THE INVENTION

Therefore, it is an aspect of the invention to provide a system and method to control a linear compressor, which is capable of varying a freezing force, as trigger signals are applied to triacs based on a phase difference between displacement of a motor and current thereof, are controlled.

In accordance with an aspect of the invention, there is provided a system to control a linear compressor to generate a freezing force as a piston reciprocates according to rotation of a motor which receives alternating current power through a triac. The system comprises a controller to move up or delay a trigger signal corresponding to an absorption cycle or a compression cycle, such that the center point of the piston reaches a resonant point when a current and a phase difference of the motor deviate from predetermined ranges.

In one aspect, the system may further comprise a current crossing detection unit to detect crossing of the current applied to the motor; a position detection unit to detect motor displacement; a resonant determination unit to output the current crossing detected by the current crossing detection unit and phase difference information corresponding to a phase difference displacement magnitude detected by the position detection unit; and a load determination unit to output load information to determine load based on the phase difference information of the resonant determination unit. The controller moves up or delays the trigger signal based on the phase difference information of the resonant determination unit and the load information of the load determination unit, such that the center point of the piston reciprocation can be controlled to coincide with the resonant point.

In another aspect, the system may further comprise a voltage detection unit to detect a motor voltage; and a position calculation unit to calculate displacement of the motor based on the motor voltage detected by the voltage detection unit and the motor current. The resonant determination unit outputs the motor displacement calculated by the position calculation unit and the phase difference information based on a phase difference magnitude of the current crossing.

In another aspect, the load determination unit determines that the load is normal when the motor displacement leads by phase of the motor current plus 90°, that the load is a small load when the motor displacement leads by a phase of the motor current plus 90° and a predetermined value, and that the load is an overload when the motor displacement leads by a phase of the motor current minus 90° and a predetermined value.

In another aspect, the resonant point is a point where the center point of the piston reciprocation is controlled to coincide with the center of teeth of a stator of the motor.

In another aspect, the controller moves up a trigger signal of the length of the compression cycle to be applied to the triac or delays a trigger signal of the length of the absorption cycle to be applied to the triac, when the load is the overload.

In still another aspect, the controller delays a trigger signal of the length of the compression cycle to be applied to the triac or moves up a trigger signal of the length of the absorption cycle to be applied to the triac, when the load is the small load.

In accordance with another aspect of the invention, there is provided a method for controlling a linear compressor for generating a freezing force as a piston reciprocates according to rotation of a motor which receives alternating current power through a triac, comprising detecting current and displacement of the motor when the linear compressor is driven; determining whether a center point of piston reciprocation is a resonant point based on the motor current and phase difference of the motor displacement; and moving up or delaying a trigger signal corresponding to an absorption cycle or a compression cycle to be applied to the triac, if the center point of the piston reciprocation is not the resonant point.

In one aspect, the moving up or delaying comprises moving up a trigger signal of the length of the compression cycle to be applied to the triac, or delaying a trigger signal of the length of the absorption cycle to be applied to the triac, when the center point of the piston reciprocation is moved to the absorption cycle side from the resonant point.

In another aspect, the moving up or delaying comprises delaying a trigger signal of the length of the compression cycle to be applied to the triac or moving up a trigger signal of the length of the absorption cycle to be applied to the triac, when the center point of the piston reciprocation is moved to the compression cycle side from the resonant point.

In accordance with another aspect of the invention, there is provided a method for controlling a linear compressor having a piston reciprocated by rotation of a motor, comprising controlling a center point of piston reciprocation to coincide with a center of teeth of a stator of the motor, and performing a resonant trace to maintain a resonant point.

In accordance with another aspect of the invention, there is provided a system to control a linear compressor having a piston reciprocated by rotation of a motor, comprising a controller to control a center point of piston reciprocation to coincide with a center of teeth of a stator of the motor, and to perform a resonant trace to maintain a resonant point. In accordance with another aspect of the invention, there is provided a system to control a linear compressor to generate a freezing force as a piston reciprocates according to rotation of a motor which receives power through a switch, comprising means for detecting current and displacement of the motor when the linear compressor is driven, means for determining whether a center point of piston reciprocation is a resonant point based on the motor current and a phase difference of the motor displacement, and means for moving up or delaying a trigger signal corresponding to an absorption cycle or a compression cycle to be applied to the switch, if the center point of the piston reciprocation is not the resonant point.

In accordance with still another aspect of the invention, there is provided a system to control a linear compressor as a piston reciprocates according to rotation of a motor which receives power through a switch, comprising means for determining phase difference information corresponding to a phase difference displacement magnitude, and load information, means for moving up or delaying a trigger signal corresponding to an absorption cycle or a compression cycle, such that the center point of the piston reaches a resonant point when a current and a phase difference of the motor deviate from predetermined ranges, wherein the moving up or delaying of the trigger signal is based on the phase difference information and the load information, such that the center point of the piston reciprocation can be controlled to coincide with the resonant point.

Additional aspects and/or advantages of the invention will be set forth in part in the description which follows and, in part, will be clear from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
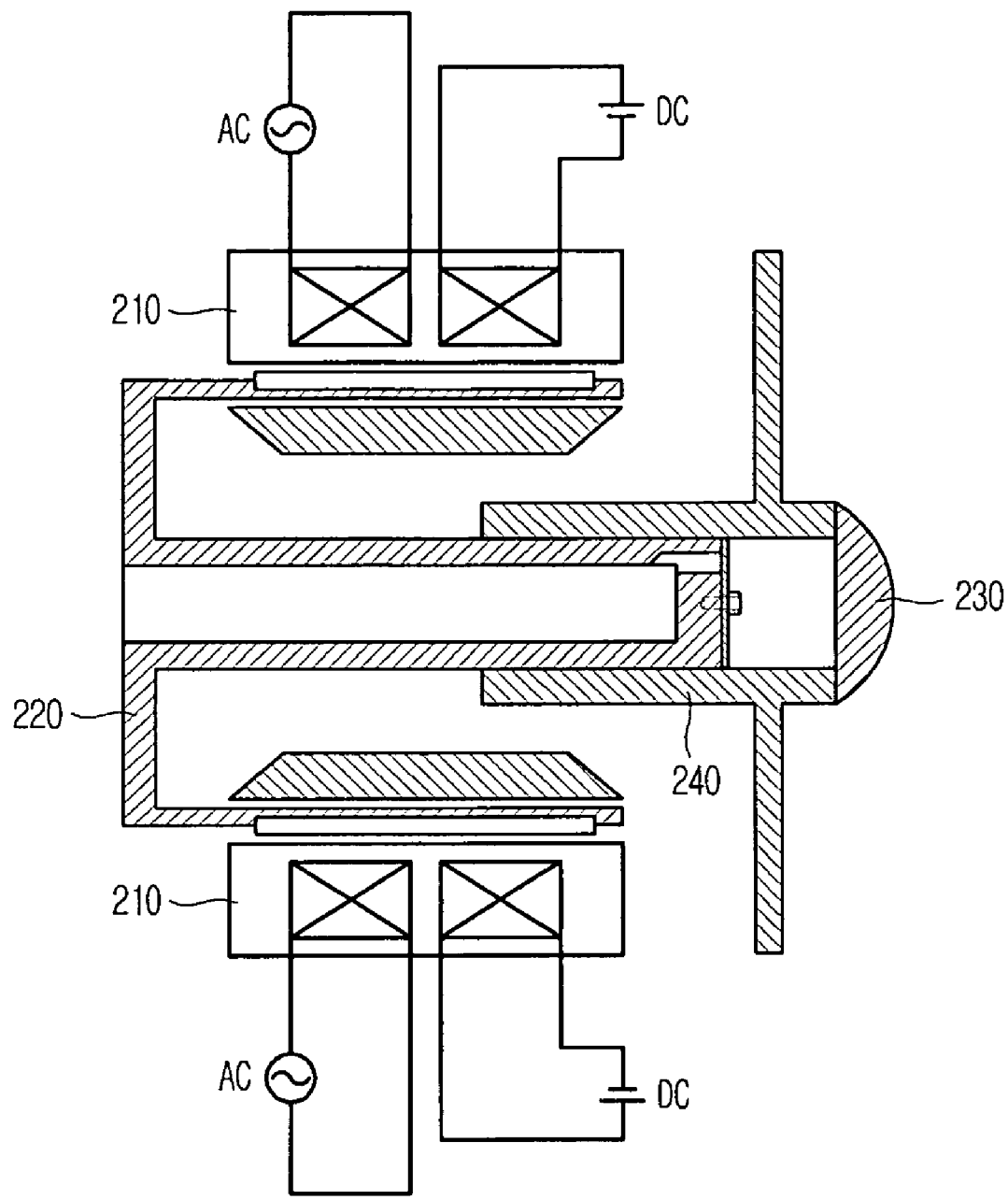
FIG. 1 is a diagram illustrating a prior art device for driving a linear compressor using AC and DC.
Figure 2:
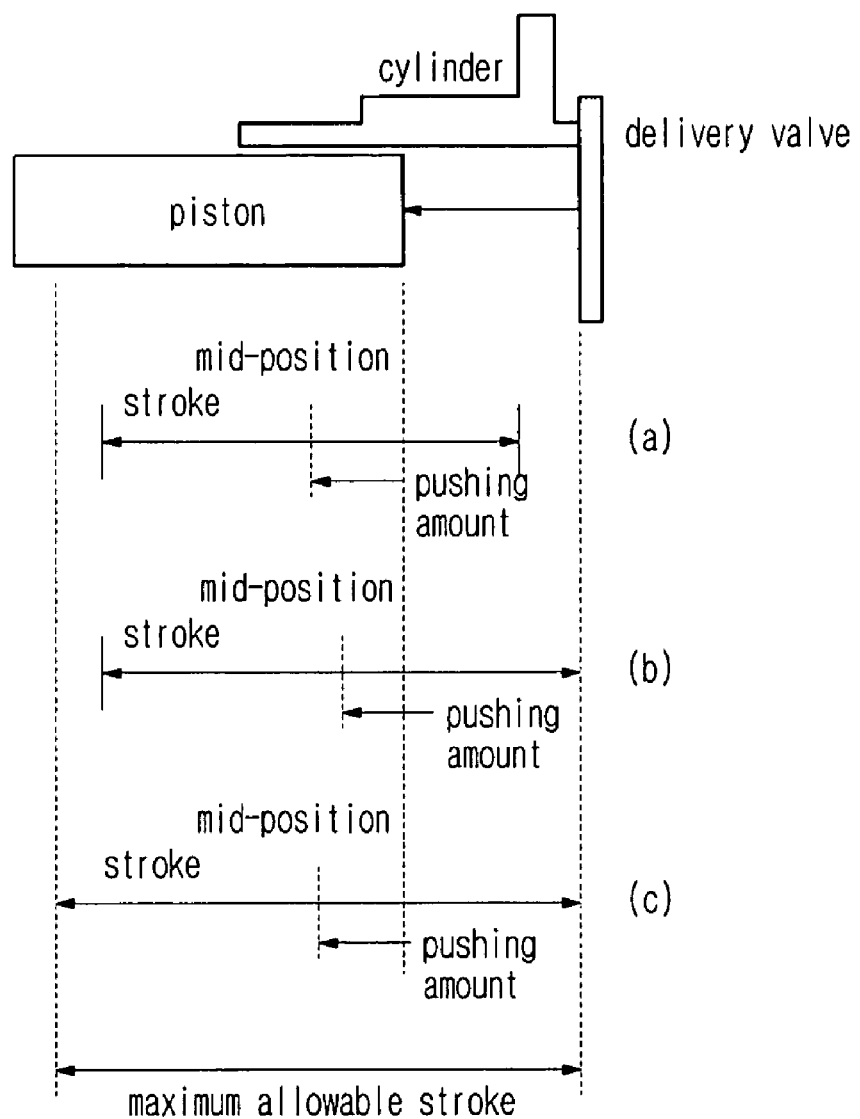
FIG. 2 is a diagram illustrating a state wherein the center of piston cycling is moved as a shoved amount of a piston is varied based on load conditions.
Figure 3:
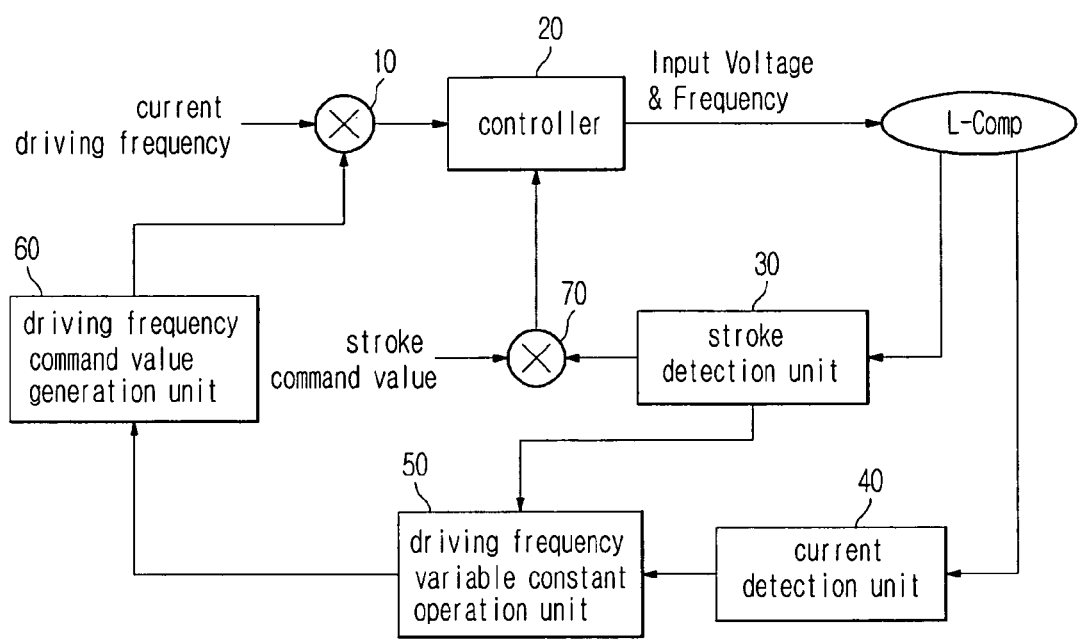
FIG. 3 is a block diagram of a controller of a linear compressor for varying driving frequency using prior art inverters.
Figure 4:
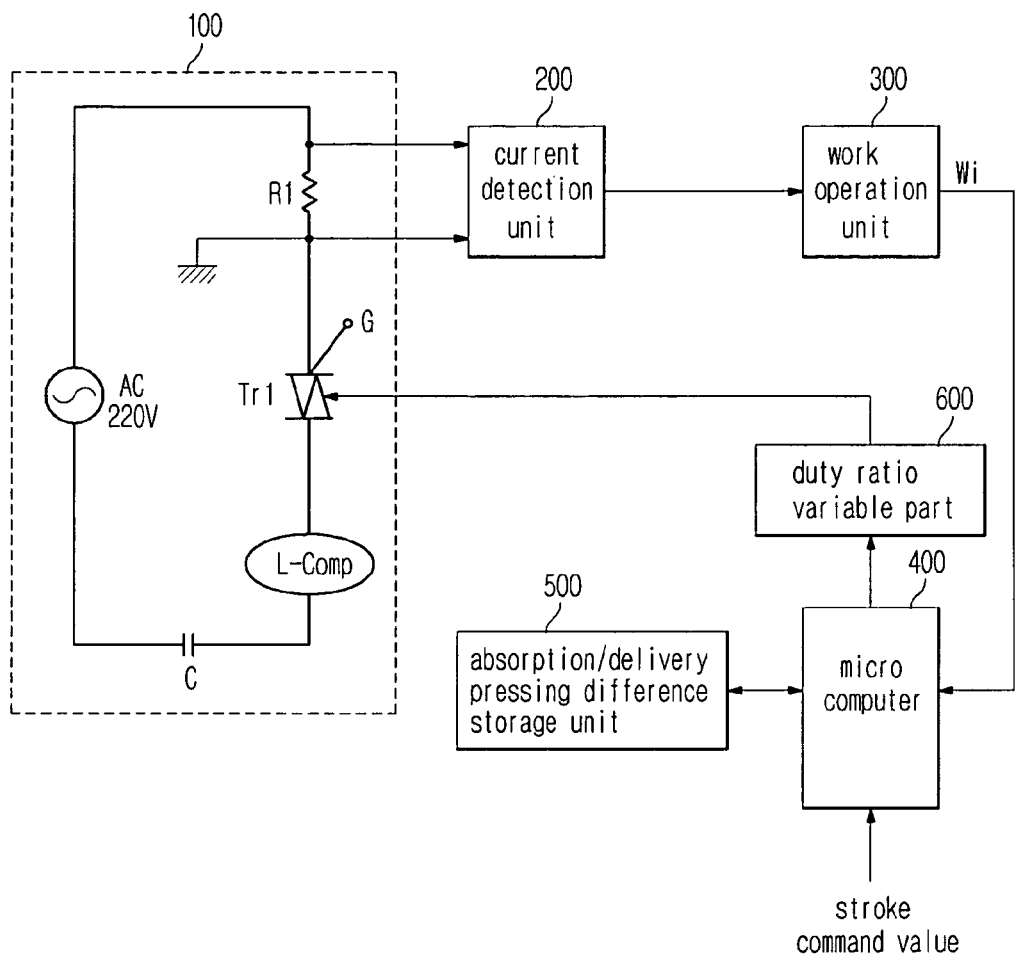
FIG. 4 is a bock diagram of a configuration wherein load is detected according to a work arithmetic signal which is obtained as current is integrated and turn on times of triacs based on the detected load, are controlled.
Figure 5:
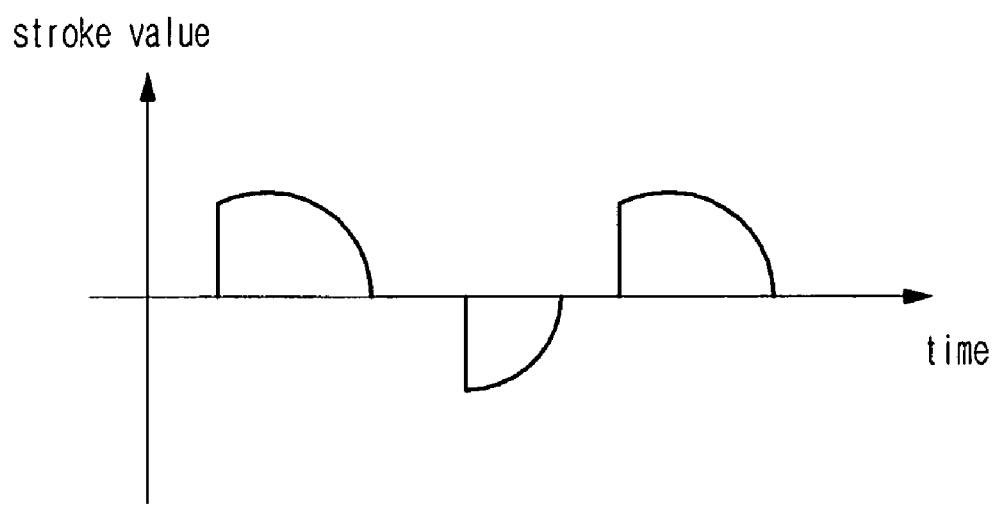
FIG. 5 is a graph illustrating waveforms of stroke voltages applied to a linear compressor by a microcomputer of FIG. 4, in which stroke voltage of a compression cycle is larger than that of a suction cycle.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 6:
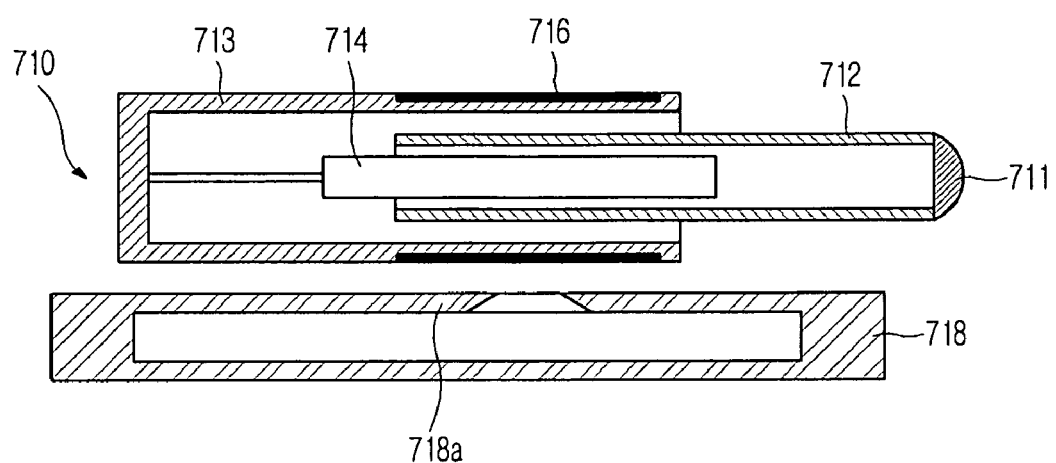
FIG. 6 is a diagram illustrating a linear compressor according to the present invention.

As shown in FIG. 6, the linear compressor 710 according to the present invention includes a cylinder 712, a piston 714 and a motor stator 718. The piston 714 is directly connected to a motor mover 713 such that it can perform reciprocation in the cylinder 712. When alternating current is applied to motor windings, based on operation of a permanent magnet 716, the piston 714 reciprocates. The piston 714 performs a compression cycle and an absorption cycle alternatively. Here, when the center point of the reciprocation of the piston 714 is concurrent with the center point of teeth 718a of the stator 718, it is located at a resonant point. When the piston 714 reciprocates at the resonant point, maximum efficiency is secured. Therefore, the compressor 710 is assembled, such that the center point of the reciprocation of the piston 714 is concurrent with the teeth 718a of the stator 718.

Figure 7:
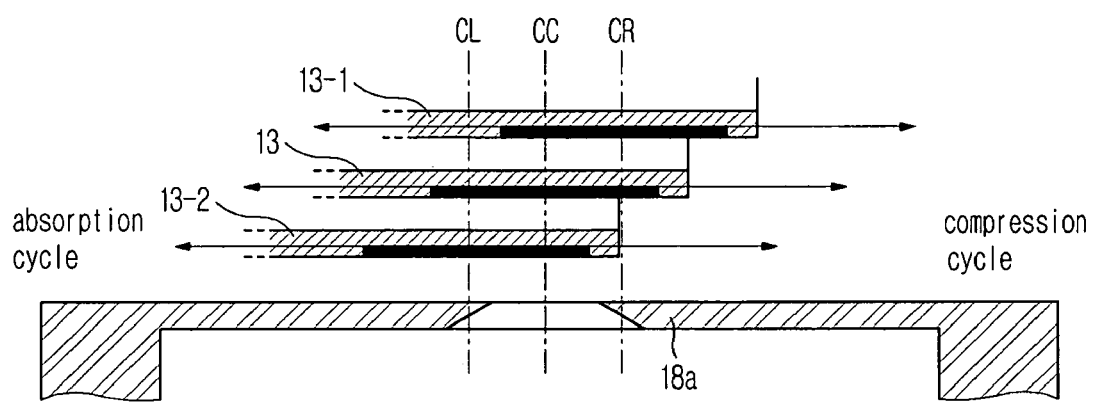
FIG. 7 is a diagram illustrating the center of reciprocation of a piston based on load conditions of the linear compressor of FIG. 6.

Although the center point of piston reciprocation is coincident with the resonant point when the compressor 710 is assembled, when the linear compressor 710 mounted on a refrigerator or air conditioner, is substantially driven, piston pushing appears based on loads. As a result, the center point of reciprocation moves. As shown in FIG. 7, when operating under a normal load, the center point CC of piston reciprocation is located at the center of the teeth 718a of the stator. When operating under overload, the center point CL of reciprocation is moved to an absorption cycle side of the center point CC of the reciprocation under normal load. When operating under a small load, the center point CR of reciprocation is moved to a compression cycle side. As such, in order to rule out the effects of piston pushing, resonant tracing is required such that the center point of reciprocation can reach the resonant point according to load change. Namely, when operating under overload, the center point CC of reciprocation is moved to the compression cycle side, such that it can reach the resonant point. On the other hand, when operating under a small load, the center point CR of reciprocation is moved to the absorption cycle side, such that it can reach the resonant point.

Figure 8:
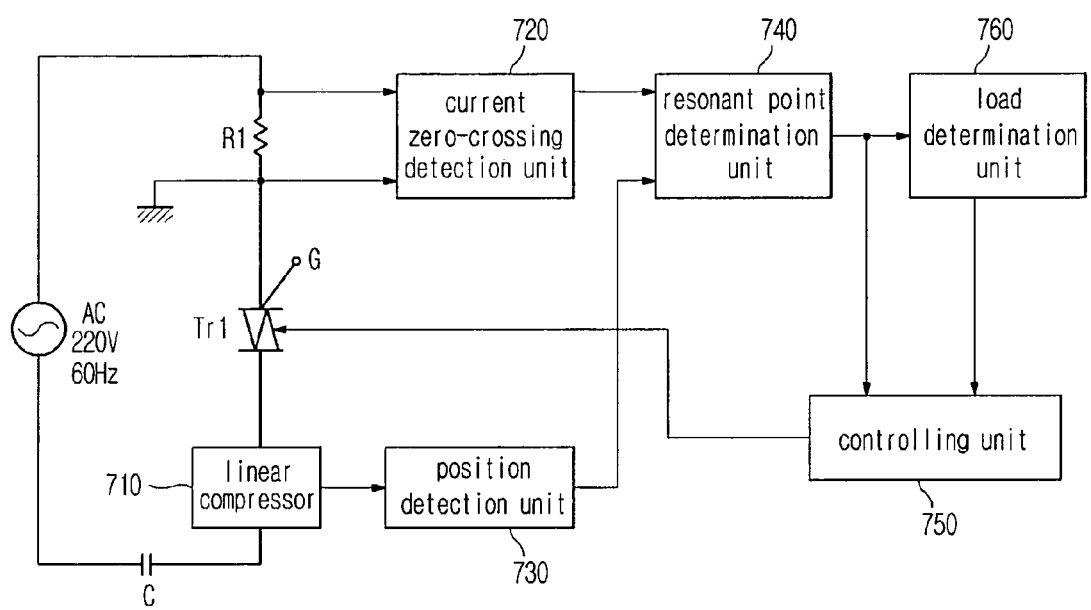
FIG. 8 is a block diagram of a linear compressor controller according to the present invention.

As shown in FIG. 8, a controller of the linear compressor according to the present invention includes an electric circuit to apply AC power 220V, 60Hz, to the linear compressor 710 through a triac Tr1.

A controlling unit 750 outputs a trigger signal to turn on the triac Tr1. The triac Tr1 applies AC power of 60Hz to the motor of the linear compressor 710 according to the trigger signal, such that the motor can be driven.

When driving the motor, a current zero-crossing detection unit 720 detects crossing of the current applied to the linear compressor 710, and a position detection unit 730 detects displacement of the motor of the linear compressor 710. Here, the position detection unit 730 includes coils to detect displacement of the motor thereon, such that the displacement can be detected by using the change of magnetic fields which is induced to the coils based on the position of the piston.

A resonant point determination unit 740 determines a resonant point based on a current crossing detected by the current zero-crossing detection unit 720 and the phase difference of motor displacement detected by the position detection unit 730. After that, the resonant point determination unit 740 outputs information corresponding to phase difference to a controlling unit 750 and a load determination unit 760. Here, the phase difference information refers to a phase difference magnitude.

A load determination unit 760 determines whether a load is a normal load, an overload, or a small load (non-load), based on the phase difference information, and then provides the determination result to the controlling unit 750. When the displacement of the motor leads by more than a phase of current to which 90° is added, it determines that the load is normal. On the other hand, when the displacement of the motor leads by more than a phase of current to which a value greater than 90° is added, it determines that the load is a small load (non-load). Also, when the displacement of the motor leads by more than a phase of current to which a value smaller than 90° is added, it determines that the load is an overload. The load determination unit provides load information to the controlling unit.

The controlling unit 750 determines turn-on time of the triac, based on phase difference information from the resonant point determination unit and load information from the load determination unit, and then applies a trigger signal according to the determination result to the triac Tr1. Namely, when the controlling unit 750 determines that the load is an overload, it delays turn on time of the triac Tr1 at an absorption cycle such that the center point of reciprocation can reach the resonant point or moves up turn on time of the triac Tr1 at a compression cycle, such that the center point of reciprocation can reach the resonant point. When the controlling unit determines that the load is a small load, it moves up turn on time of the absorption cycle, such that the center point of reciprocation can reach the resonant point, or delays turn on time of the triac Tr1 at the compression cycle such that the center point of reciprocation can reach the resonant point.

The controller of the linear compressor 710, which is constructed as above, will be described in detail below.

Figure 9:
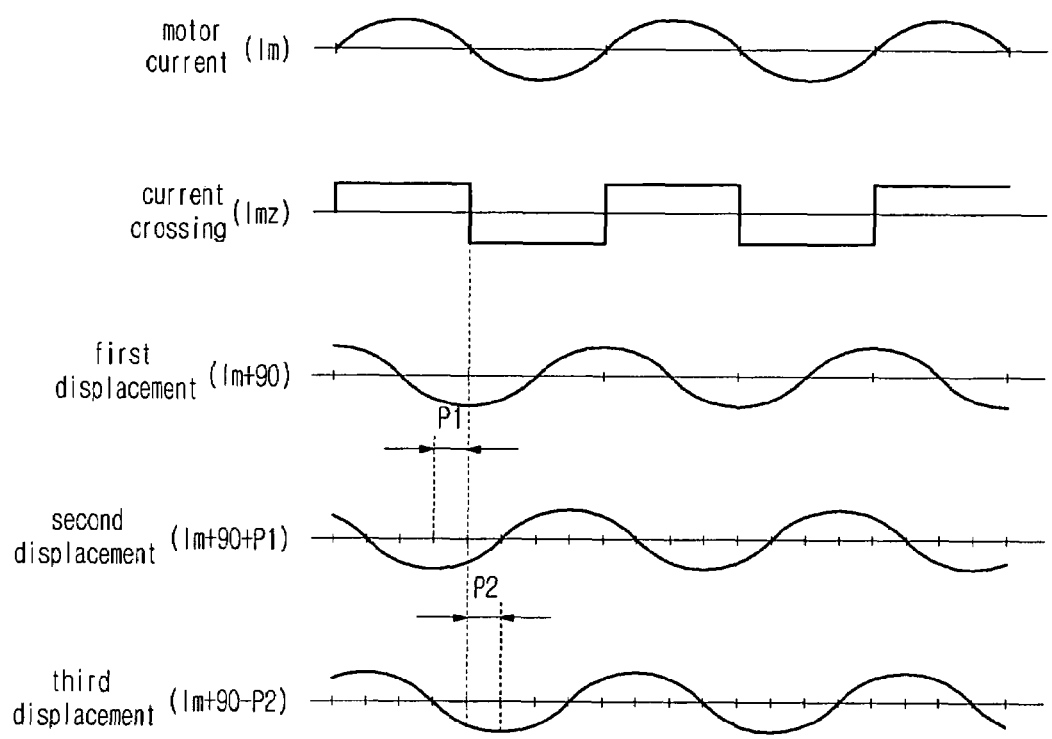
FIG. 9 is a graph illustrating a relationship between motor current and motor displacement phase according to the present invention.

First of all, the relationship between the motor current and the phase for displacement thereof is described as follows. As show in FIG. 9, when a turn on period of a triac is 100%, the motor current phase lm is periodically changed between positive and negative. When zero crossing of the motor current is detected, a current zero crossing signal lmz is obtained by the current zero crossing detection unit 720. When the linear compressor 710 is operated under a normal load, motor displacement is obtained by the position detection unit 730. Namely, a first displacement lm+90°, which is lead by 90° with respect to the phase of the motor current lm, is detected. At this time, since the center point of piston reciprocation coincides with the teeth of the stator, it is located at the resonant point. When the linear compressor is operated at the overload, motor displacement is obtained by the position detection unit 730. Namely, a second displacement lm+90°+ P1, which is lead by 90° plus a phase P1 with respect to the phase of the motor current lm, is detected. At this time, the center point of piston reciprocation is moved to the absorption cycle side from the resonant point. In this situation, in order to move the center point of reciprocation to the resonant point, the controller applies a trigger signal to reduce the length of the absorption cycle or increase the length of the compression cycle to the triac Tr1.

Figure 10:
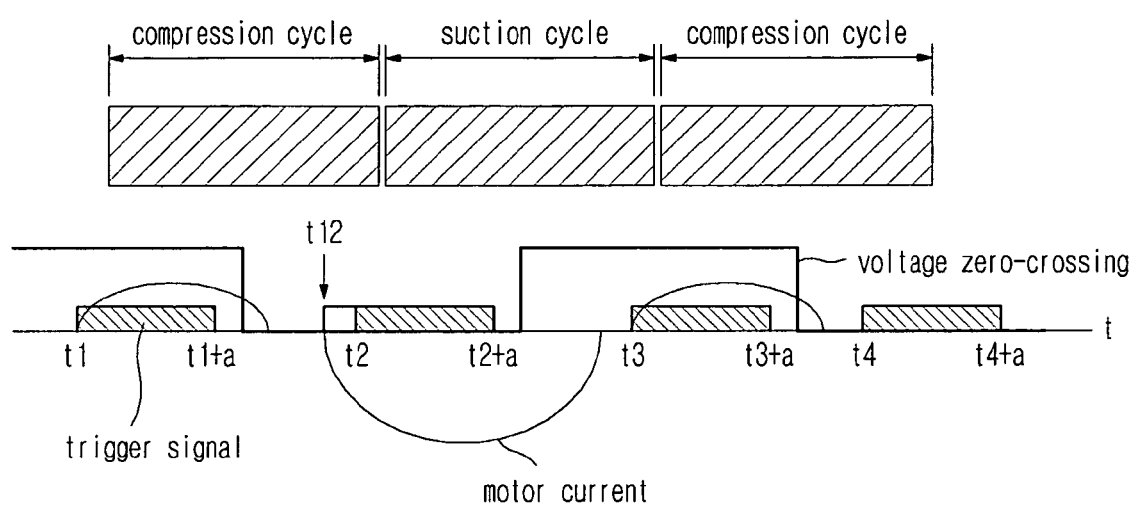
FIG. 10 is a diagram illustrating an operation wherein a suction cycle trigger signal leads to an increased suction cycle, according to the present invention.

On the other hand, when the linear compressor 710 is operated at the small load, motor displacement is obtained by the position detection unit 730. Namely, a third displacement lm+90°−P2, which is lead by 90° minus a phase P2 with respect to the phase of the motor current lm, is detected. At this time, the center point of piston reciprocation is moved to the compression cycle side from the resonant point. In this situation, in order to move the center point of reciprocation to the resonant point, the controller applies a trigger signal to reduce the length of the compression cycle or increase the length of the absorption cycle to the triac Tr1. Here, when the length of the absorption cycle is increased, as shown in FIG. 10, the trigger signal is applied to the triac Tr1 at time t12 prior to time t2. Then, as the turn on period of the trigger signal is increased, when motor current is increased, since the piston cycle length increases, the center point of reciprocation is moved to the center of the teeth of the stator, thereby reaching the resonant point.

Figure 11:
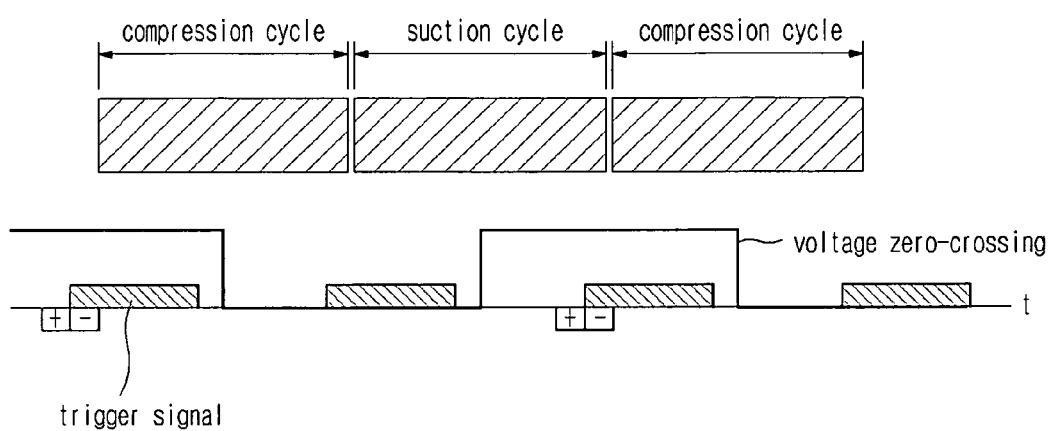
FIG. 11 is a diagram illustrating an operation where a suction cycle trigger signal leads or delays in order to vary a compression cycle according to the present invention.

As such, when the length of the compression cycle is varied, as shown in FIG. 11, the trigger signal is move up in the + direction, such that the turn on period of the triac Tr1 is increased (in the case of an overload), or the trigger signal is delayed in the − direction such that the turn on period of the triac Tr1 is shortened (in the case of a small load).

Figure 12:
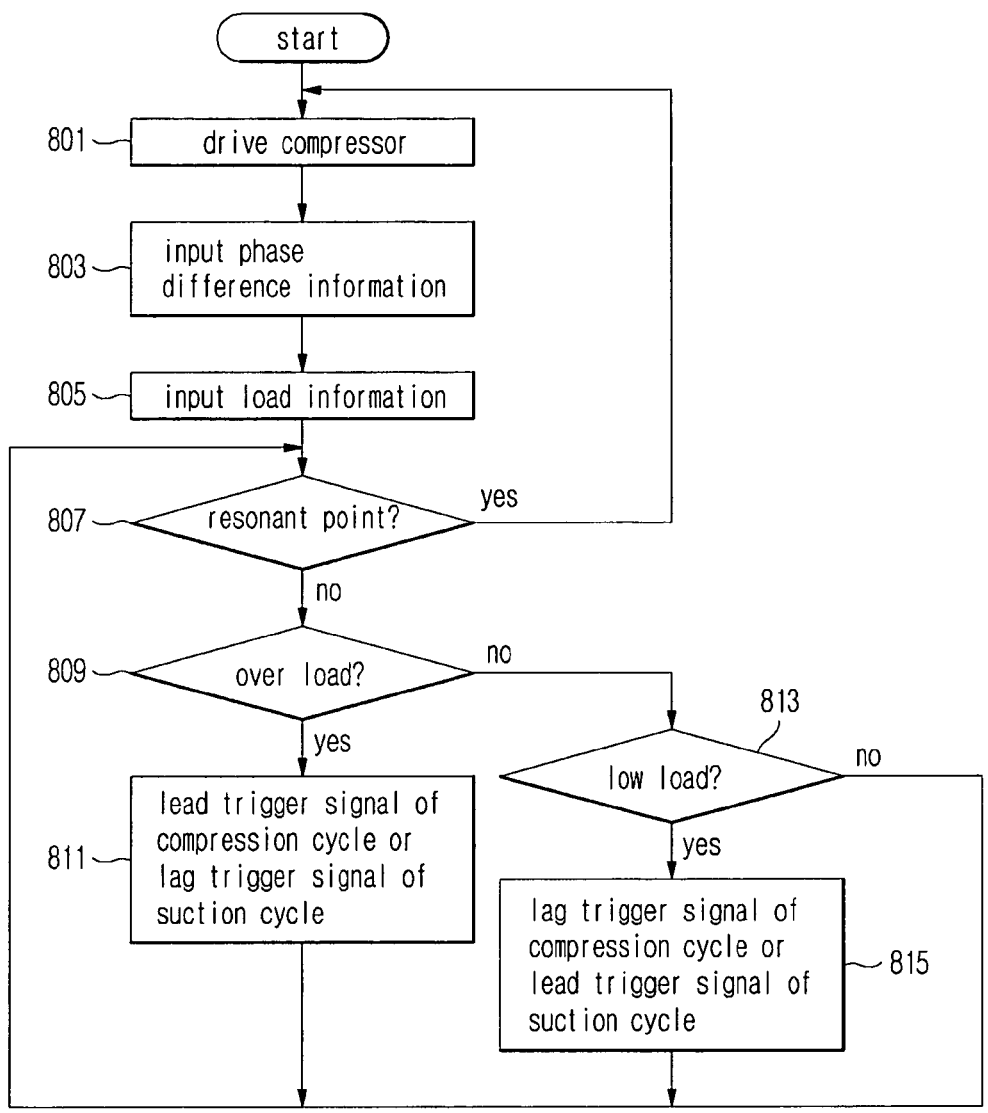
FIG. 12 is a flow chart illustrating a method for controlling a linear compressor according to the present invention.

Referring to FIG. 12, a method for controlling a linear compressor according to the present invention is described below. When the linear compressor 710 is driven at 801, the resonant point determination unit 740 provides a current zero crossing signal, detected by the current zero crossing detection unit 720, and information for the phase difference of motor displacement, detected by the position detection unit 730, to the controller 750 and the load determination unit 760 at 803. The load determination unit 760 determines whether the operation is an overload operation, a normal load operation or a small load operation, based the phase difference information, and then provides the load information to the controller 750 at 805.

The controller 750 determines whether the center point of piston reciprocation is the resonant point based on the phase difference information at 807. If the center point is located at the resonant point, the compressor 710 keeps its drive. On the other hand, if the center point is not located at the resonant point, the controller determines whether it is operated under an overload based on the load information at 809.

When it is operated under the overload, in order to increase the length of the compression cycle, a trigger signal of the compression cycle is moved up to be applied to the triac Tr1, or in order to reduce the length of the absorption cycle, the trigger signal of the absorption is delayed to be applied to the triac Tr1 at 811.

On the other hand, if the operation is not under the overload, the controller 750 determines whether it is operated at the small or low load based on the load information at 813. When the operation is at the small operation, in order to reduce the compression cycle, the trigger signal of the compression cycle is delayed to be applied to the triac Tr1, or in order to increase the length of the absorption cycle, the trigger signal of the absorption cycle is moved up to be applied to the triac at 815.

Figure 13:
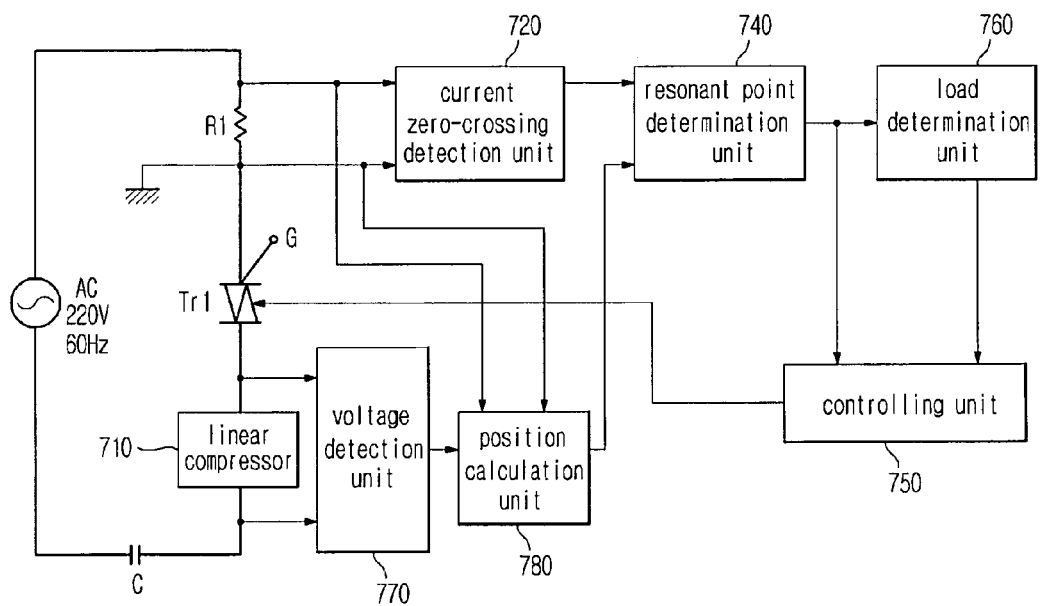
FIG. 13 is a block diagram of a controller of a linear compressor according to another embodiment of the present invention.

Although the above-mentioned embodiment of the present invention is implemented such that the position detection unit 730 directly detects motor displacement, modification thereof is possible, as shown in FIG. 13. Namely, as shown in FIG. 13, another embodiment of the present invention is configured such that it can input motor current applied to a motor and motor voltage applied to both ends of the compressor 710, and includes a position calculation unit 780 which calculates motor displacement based on the motor current and motor voltage. The motor displacement calculated in the position calculation unit is provided to the resonant point determination unit 740, such that the resonant point determination unit 740 can provide the motor current and information corresponding to phase difference of the motor displacement to the controlling unit 750 and the load determination unit 760, respectively. Although methods for obtaining the motor displacements are different between the embodiments of the present invention, since trigger signals to trace the resonant point are identically processed between the same embodiments, detailed description thereof will be omitted.

As mentioned above, although load conditions are varied, since the center point of piston reciprocation is controlled to coincide with the center of the teeth of the stator, and then resonant trace to maintain the resonant point, is performed, the linear compressor according to the present invention can be operated at a relatively high compression ratio and with high efficiency. Also, since the resonant point and load can be determined based on the motor current and phase difference of motor displacement, and then turn on time of the triac is controlled, it is easy to trace resonance. Furthermore, since the present invention does not require a relatively expensive controller to control inverters, it is cost-effective.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system, comprising:
    a motor receiving alternating current power through a triac;
    a linear compressor generating a freezing force as a piston reciprocates according to rotation of the motor which receives the alternating current power; and
    a controller to move up or delay a trigger signal corresponding to an absorption cycle or a compression cycle, such that the center point of the piston reaches a resonant point when a current and a phase difference of the motor deviate from predetermined ranges.

2. The system as set forth in claim 1, further comprising:
    a current crossing detection unit to detect crossing of the current applied to the motor;
    a position detection unit to detect motor displacement;

a resonant determination unit to output the current crossing detected by the current crossing detection unit and phase difference information corresponding to a phase difference displacement magnitude detected by the position detection unit; and a load determination unit to output load information to determine load based on the phase difference information of the resonant determination unit, wherein the controller moves up or delays the trigger signal based on the phase difference information of the resonant determination unit and the load information of the load determination unit, such that the center point of the piston reciprocation can be controlled to coincide with the resonant point.

3. The system as set forth in claim 2, further comprising:
a voltage detection unit to detect a motor voltage; and
a position calculation unit to calculate displacement of the motor based on the motor voltage detected by the voltage detection unit and the motor current, wherein the resonant determination unit outputs the motor displacement calculated by the position calculation unit and the phase difference information based on a phase difference magnitude of the current crossing.

4. The system as set forth in claim 2, wherein the load determination unit determines that the load is normal when the motor displacement leads by a phase of the motor current plus 90°, that the load is a small load when the motor displacement leads by a phase of the motor current plus 90° and a predetermined value, and that the load is an overload when the motor displacement leads by a phase of the motor current minus 90° and a predetermined value.

5. The system as set forth in claim 1, wherein the resonant point is a point where the center point of the piston reciprocation is controlled to coincide with the center of teeth of a stator of the motor.

6. The system as set forth in claim 4, wherein the controller moves up a trigger signal of the length of the compression cycle to be applied to the triac, or delays a trigger signal of the length of the absorption cycle to be applied to the triac, when the load is the overload.

7. The system as set forth in claim 4, wherein the controller delays a trigger signal of the length of the compression cycle to be applied to the triac or moves up a trigger signal of the length of the absorption cycle to be applied to the triac, when the load is the small load.

8. A method for controlling a linear compressor for generating a freezing force as a piston reciprocates according to rotation of a motor which receives alternating current power through a triac, the method comprising:

detecting motor current and motor displacement of the motor when the linear compressor is driven;

determining whether a center point of piston reciprocation is a resonant point based on the detected motor current and a phase difference of the motor displacement; and moving up or delaying a trigger signal corresponding to an absorption cycle or a compression cycle to be applied to the triac, if the center point of the piston reciprocation is not the resonant point.

9. The method as set forth in claim 8, wherein the moving up or delaying comprises moving up a trigger signal of the length of the compression cycle to be applied to the triac, or delaying a trigger signal of the length of the absorption cycle to be applied to the triac, when the center point of the piston reciprocation is moved to the absorption cycle side from the resonant point.

10. The method as set forth in claim 8, wherein the moving up or delaying comprises delaying a trigger signal of the length of the compression cycle to be applied to the triac or moving up a trigger signal of the length of the absorption cycle to be applied to the triac when the center point of the piston reciprocation is moved to the compression cycle side from the resonant point.

11. A method for controlling a linear compressor having a piston reciprocated by rotation of a motor, comprising:

moving a center point of piston reciprocation to a compression cycle side or to an absorption cycle side of the piston to coincide with a center of teeth of a stator of the motor; and performing a resonant trace to maintain a resonant point.

12. The method as set forth in claim 11, further comprising:
determining the resonant point based on a current of the motor and a phase difference of the motor displacement; and controlling a turn-on time of the motor.

13. A system, comprising:
a motor;
a linear compressor having a piston reciprocated by rotation of the motor; and
a controller to move a center point of piston reciprocation to a compression cycle side or to an absorption cycle side of the piston to coincide with a center of teeth of a stator of the motor, and to perform a resonant trace to maintain a resonant point.

14. The system as set forth in claim 13, wherein said controller determines the resonant point based on a current of the motor and a phase difference of the motor displacement, and controls a turn-on time of the motor.

15. A system to control a linear compressor to generate a freezing force as a piston reciprocates according to rotation of a motor which receives power through a switch, comprising:

means for detecting current and displacement of the motor when the linear compressor is driven;

means for determining whether a center point of piston reciprocation is a resonant point based on the motor current and a phase difference of the motor displacement; and means for moving up or delaying a trigger signal corresponding to an absorption cycle or a compression cycle to be applied to the switch, if the center point of the piston reciprocation is not the resonant point.

16. A system as set forth in claim 15, wherein the switch is a triac.

17. A system as set forth in claim 15, wherein said means for moving up or delaying comprises means for moving up a trigger signal of the length of the compression cycle to be applied to the switch, or delaying a trigger signal of the length of the absorption cycle to be applied to the switch, when the center point of the piston reciprocation is moved to the absorption cycle side from the resonant point.

18. A system as set forth in claim 17, wherein the switch is a triac.

19. A system to control a linear compressor as a piston reciprocates according to rotation of a motor which receives power through a switch, comprising:

means for detecting a phase difference displacement magnitude;

means for determining phase difference information corresponding to the phase difference displacement magnitude, and load information; and means for moving up or delaying a trigger signal corresponding to an absorption cycle or a compression cycle, such that the center point of the piston reaches a resonant point when a current and a phase difference of the motor deviate from predetermined ranges, wherein the moving up or delaying of the trigger signal is based on the phase difference information and the load information, such that the center point of the piston reciprocation can be controlled to coincide with the resonant point.

20. A system as set forth in claim 19, wherein the switch is a triac.

* * * * *

UNITED STATES PATENT AND TRADEMARK OFFICE
CERTIFICATE OF CORRECTION

| | | |
|---|---|---|
| PATENT NO. | : 7,405,529 B2 | Page 1 of 1 |
| APPLICATION NO. | : 11/328091 | |
| DATED | : July 29, 2008 | |
| INVENTOR(S) | : Nam Su Kim et al. | |

It is certified that error appears in the above-identified patent and that said Letters Patent is hereby corrected as shown below:

Column 10, Line 3, change "triac" to --triac,--.

Signed and Sealed this

Twenty-eighth Day of October, 2008

JON W. DUDAS
*Director of the United States Patent and Trademark Office*